United States Patent [19]
Okada et al.

[11] Patent Number: 5,789,107
[45] Date of Patent: Aug. 4, 1998

[54] NONAQUEOUS POLYMER BATTERY

[75] Inventors: Mikio Okada; Hideo Yasuda, both of Kyoto, Japan

[73] Assignee: Japan Storage Battery Co., Ltd., Kyoto, Japan

[21] Appl. No.: 736,483

[22] Filed: Oct. 24, 1996

[51] Int. Cl.[6] .................................................. H01M 10/40
[52] U.S. Cl. ........................ 429/192; 429/218; 429/223
[58] Field of Search .......................... 429/60, 192, 223, 429/218

[56] References Cited

U.S. PATENT DOCUMENTS

| | | | |
|---|---|---|---|
| 3,214,501 | 10/1965 | Strauss | 264/49 |
| 3,640,829 | 2/1972 | Elton | 161/159 |
| 4,247,498 | 1/1981 | Castro | 264/41 |
| 4,346,142 | 8/1982 | Lazear | 428/315.7 |
| 4,539,256 | 9/1985 | Shipman | 428/315.5 |
| 5,296,318 | 3/1994 | Gozdz et al. | 429/192 |
| 5,358,805 | 10/1994 | Fujimoto et al. | 429/218 |
| 5,429,890 | 7/1995 | Pynenburg et al. | 429/192 |
| 5,626,635 | 5/1997 | Yamamura et al. | 429/218 X |
| 5,631,105 | 5/1997 | Hasegawa et al. | 429/218 X |

FOREIGN PATENT DOCUMENTS

| | | |
|---|---|---|
| 0 517 069 | 12/1992 | European Pat. Off. |
| 0 571 858 | 12/1993 | European Pat. Off. |
| 8-195220 | 7/1996 | Japan |
| 95/24741 | 9/1995 | WIPO |

OTHER PUBLICATIONS

"Impedance Studies for Separators in Rechargeable Lithium Batteries"; Eletrochemical Society Letters; J. Electrochem. Soc., vol. 140, No. 4, Apr. 1993; pp.L51–L53 Laman et al.

"Li$^+$–Conductive Solid Polymer Electrolytes with Liquid–Like Conductivity", Abraham et al.; J. Electrochem Soc. vol. 137, No. 5, May 1990; pp. 1657–1658.

"A polyacrylonitrile–based gelled electrolytle: electrochemical kinetic studies"; G. Nagasubramanian et al.; Journal of Applied Electrochemistry 24 (1994) pp. 298–302. (month unknown).

"A Mechanism of Ionic Conduction of Poly (Vinylidene Fluoride)–Lithium Perchlorate Hybrid Films"; Koichi Tsunemi et al.; Eelctrochimica Acta, vol. 28, No. 6, pp. 833–837, 1983. (month unknown).

"Conduction of Lithium Ions In Polyvinylidene Fluoride and Its Derivatives—I"; Tsuchida et al.; Electrochimica Acta., vol. 28. No. 5, pp. 591–595, 1983. (month unknown).

"Li Ion Conductive Electrolytes Based on Poly(vinyl chloride)"; M. Alamgir et al.; J. Electrochem. Soc.; vol. 140, No. 6, Jun. 1993; pp. L96–L97.

(List continued on next page.)

*Primary Examiner*—Stephen Kalafut
*Attorney, Agent, or Firm*—Sughrue, Mion, Zinn, Macpeak & Seas, PLLC

[57] ABSTRACT

A nonaqueous polymer battery includes a lithium ion conductive polymer having pores, a positive active material, and a carbonaceous negative active material. In the nonaqueous polymer battery, the positive active material is represented by $Li_{1-x}CoO_2$ ($0 \leq x \leq 1$) wherein the molar ratio of the carbon atoms in the negative active material to the cobalt atoms in the positive active material is 7.5 or lower; the positive active material is represented by $Li_{1-x}NiO_2$ ($0 \leq x \leq 1$) wherein the molar ratio of the carbon atoms in the negative active material to the nickel atoms in the positive active material is less than 10; or the positive active material is represented by $Li_{1-x}Ni(Co)O_2$ ($Li_{1-x}NiO_2$ having not more than 20% of the nickel atoms thereof displaced with cobalt ions; $0 \leq x \leq 1$) wherein the ratio of the number of the moles of the carbon atoms present in the negative active material to the total number of the moles of the cobalt atoms and the nickel atoms present in the positive active material is less than 10.

18 Claims, 3 Drawing Sheets

OTHER PUBLICATIONS

"Preparation and Characterization of Poly(Vinyl Sulfone)- and Poly(Vinylidene Fluoride)-Based Electrolytes"; Electrochimica Acta. vol. 40 No. 13-14 pp. 2289-2283; 1995 Choe et al. (month unknown).

"Room Temperatur Polymer Electrolytes and Batteries Based on Them"; K.M. Abraham et al.; Solid State Ionics 70/71 (1994) pp. 20-26 North-Holland. (month unknown).

"Ionic Conductivity of Dual-Phase Polymer Electrolytes Comprised of NBR/SBR Latex Films Swollen with Lithium Salt Solutions"; Matsumoto et al; J. Electrochem. Soc., vol. 141, No. 8, Aug. 1994; pp. 1989-1993.

"Ion-Free Latex Films Composed of Fused Polybutadiene and Poly(Vinyl Pyrrolidone) Particles as Polymer Electrolyte Materials"; Rutt et al; Journal of Polymer Science: Part A: Polymer Chemistry, vol. 32, pp. 779-787, 1994.(month unknown).

"Polymer Electrolytes Reinforced by Celgard Membranes"; Abraham et al.; J. Electrochem. Soc., vol. 142, No. 3, Mar. 1995; pp. 683-687.

"Polymer-ceramic Composite Electrolytes"; Kumar et al.; Journal of Power Sources; 52 (1994) 261-268. (month unknown).

"Effective Medium Theory in Studies of Conductivity of Composite Polymeric Electrolytes"; Przyluski et al.; Electrochimica Acta. vol. 40, No. 13-14, pp. 2101-2108. (month unknown).

"The SEI Model-Application to Lithium-Polymer Electrolyte Batteries"; Peled et al.; Electrochimica Acta. vol. 40, No. 13 14, pp. 2197-2204. 1995. (month unknown).

"Some Aspects on the Preparation, Structure and Physical and Electrochemical Properties of $Li_xC_6$";Yazami et al; Journal of Power Sources, 43-44 (1993); pp. 39-46. (month unknown).

"Material Balance of Petroleum Coke/$LiNiO_2$ Lithium-Ion Cells"; Moshtev et al., Journal of Power Sources 56 (1995), 137-144 * month unknown.

5,789,107

NONAQUEOUS POLYMER BATTERY

BACKGROUND OF THE INVENTION

1. Field of the Invention

The present invention relates to a nonaqueous lithium type battery using a lithium ion conductive polymer having pores.

2. Description of the Related Art

With the recent advancement of electronic equipments, development of high performance batteries has been expected. A power source mainly used in electronic equipments includes a primary battery such a as manganese dioxide-zinc battery; or a secondary battery such as a lead acid battery or a alkaline battery, e.g., a nickel-cadmium battery, a nickel-zinc battery, or a nickel-metal hydride battery.

These batteries contain an aqueous electrolytic solution, such as an alkali (e.g., potassium hydroxide) aqueous solution or a sulfuric acid aqueous solution. The theoretical decomposition voltage of water is 1.23 V. In a battery system having a voltage higher than this, water is liable to decomposition, thereby making it difficult to store electrical energy stably. Consequently, the currently available batteries have an electromotive force of about 2 V at the most. Therefore, a nonaqueous electrolyte is to be used for high-voltage batteries of 3 V or more. Typical nonaqueous battery is a lithium battery using lithium as a negative electrode.

As a lithium primary battery, there are a manganese dioxide-lithium battery and a carbon fluoride-lithium battery. As a lithium secondary battery, there are a manganese dioxide-lithium battery and a vanadium oxide-lithium battery.

The life of a lithium secondary battery using metallic lithium as a negative electrode is short because a shortcircuit is apt to take place due to dendritic deposition of metallic lithium. Further, the high reactivity of metallic lithium makes it difficult to secure safety. Therefore, a so-called lithium ion battery using graphite or carbon in place of metallic lithium and lithium cobaltate or lithium nickelate as a positive active material has been developed and exploited as a high-energy density battery. Recently, a battery which having a higher performance and safety has been required accompanying with spreading of its application.

In a lithium battery and a lithium ion battery (hereinafter inclusively referred to as lithium type batteries), the most part of lithium ions participating in the electrode reaction of charge and discharge reactions are not lithium ions dissolved in the electrolyte but those which are released from the electrode active material and migrate in the electrolyte to reach the opposite electrode. The distance of lithium ion movement is therefore long. Besides, the transport numbers of proton and hydroxide ion in an aqueous battery approximate 1, while that of lithium ion in the electrolyte of the lithium battery is usually 0.5 or lower at room temperature. The rate of movement of ions in an electrolyte depends on the concentration diffusion of ions. Since an organic electrolyte is more viscous than an aqueous one, the rate of ion diffusion is lower. Accordingly, the lithium type nonaqueous battery are inferior to the aqueous battery in charge and discharge performance at a high charging and discharging rate.

In the lithium battery, a porous film made of polyethylene or polypropylene is used as a separator. Porous films made of polymers are mostly prepared by a casting-extraction process or a drawing process. The casting-extraction process is a process for producing a porous polymer film having no directivity, in which a polymer is cast in a solution and the cast film is immersed in a treating bath to remove the solvent to thereby leave circular or elliptical pores where the solvent has been. The porous separator obtained by the casting-extraction process has been applied to a closed nickel-cadmium battery. The drawing process is a process for producing a porous film having a directivity by drawing the polymer film. (U.S. Pat. No. 4,346,142) The drawn porous film is widely applied to a secondary battery. Additionally, a porous polymer film can be prepared by a process including sheeting a polymer containing fine particles of salt or starch and then dissolving the fine particles in liquid (U.S. Pat. Nos. 3,214,501 and 3,640,829) or a process including dissolving a polymer in liquid at a high temperature, cooling the solution to solidify the polymer, and removing the liquid (U.S. Pat. Nos. 4,247,498 and 4,539,256). It is also known that a separator can have a safety mechanism through a so-called shut-down effect that pores of a porous polymer film are closed by heat application (J. Electrochem. Soc., 140, (1993) L51). In time of danger due to heat generation, such a safety mechanism works to insulate between a positive electrode and a negative electrode to prevent further electrode reaction.

Unlike aqueous batteries using an aqueous electrolyte, such as a lead storage battery, a nickel-cadmium battery and a nickel-metal hydride battery, a lithium type battery is less safe because of their combustible organic electrolyte. Hence it has been attempted to improve safety by replacing an organic electrolyte with a less chemically reactive solid polymer electrolyte. Use of solid polymer electrolytes has also been attempted from the views of flexibility in battery shape design, simplification of production process, and reduction in production cost.

As an ion conductive polymer, many complexes of an alkali metal salt and a polyether, such as polyethylene oxide or polypropylene oxide have been studied. However, a polyether hardly exhibits high ionic conductivity while retaining sufficient mechanical strength. Besides, because its conductivity greatly depends on temperature, sufficient conductivity cannot be secured at room temperature. Accordingly, it has been proposed to use a comb type polymer having a polyether in the side chain, a copolymer comprising a polyether chain and other monomers, polysiloxane or polyphosphazene having a polyether in the side chain, or crosslinked polyether.

In an ion conductive polymer in which a salt is dissolved therein such as a polyether-based polymer electrolyte, both cations and anions migrate and the cation transport number is 0.5 or less at room temperature. In order to make the lithium ion transport number 1, an ion conductive polymer carrying an anionic group, e.g., —$SO_3$— or —$COO^-$ was synthesized to serve as a polymer electrolyte, but proved very difficult to apply to the lithium battery because lithium ions are strongly restrained by the anionic group, resulting in very low ionic conductivity.

It has also been attempted to apply a solid electrolyte in a gel state to a lithium battery. The solid electrolyte is prepared by impregnating a polymer with an electrolyte. Polymers for use in this type of electrolytes include polyacrylonitrile (J. Electrochem. Soc., 137, (1990) 1657, J. Appl. Electrochem., 24, (1994) 298), polyvinylidene fluoride (Electrochimica Acta, 28, (1983) 833, 28, (1983) 591), polyvinyl chloride (J. Electrochem. Soc., 140, (1993) L96), polyvinylsulfone (Electrochimica Acta, 40, (1995) 2289, Solid State Ionics, 70/71, (1994) 20), and polyvinylpyrrolidinone. It has been proposed to achieve improved conductivity by using a vinylidene fluoride-hexafluoropropylene copolymer which has reduced crystallinity and can easily be impregnated with an electrolyte (U.S. Pat. No. 5,296,318). It has also been proposed to prepare a lithium ion conductive polymer film by drying a latex of nitrile rubber, styrene-butadiene rubber, polybutadiene, polyvinylpyrrolidone, etc. and impregnating the resulting polymer film with an electrolyte (J. Electrochem. Soc., 141, (1994) 1989 and J. Polym. Sci., A32, (1994) 779). According to this technique, two kinds of polymers are mixed to make a mixed phase system composed of a polymer phase that has high mechanical strength and hardly allows penetration of an electrolyte and a polymer phase that has high permeability to an electrolyte to manifest high ionic conductivity, thereby to secure both mechanical strength and ionic conductivity.

There are reports on a solid electrolyte comprising a porous polyolefin film with its pores filled with a polymer electrolyte so as to have enhanced mechanical strength and improved handling properties (J. Electrochem. Soc., 142, (1995) 683) and a polymer electrolyte containing a powdered inorganic solid electrolyte so as to have improved ionic conductivity and an increased cation transport number (J. Power Sources, 52, (1994) 261, Electrochimica Acta, 40, (1995) 2101, and 40, (1995) 2197).

As described above, a number of proposals have hitherto been made on polymer electrolytes, but there still remains a problem that diffusion of lithium ions in a polymer electrolyte is slower than in an organic electrolyte, unsuccessfully exhibiting sufficient charge and discharge characteristics.

Detailed Description of the Invention:

According to the report by R. Yazami, et al., Journal of Power Sources, 43–44, (1993) 39–46, lithium reacts with carbon at 400° C. to form lithium carbide ($Li_2C_2$), whereupon considerably high reaction heat generates. The reaction temperature lowers to 280° C. under a pressure as high as $2 \times 10^9$ Pa. In a carbonaceous negative electrode, the above reaction is apt to take place when intercalation has proceeded, especially after the ratio of the number of lithium ions to the number of carbon atoms reaches 0.1. When a conventional lithium ion battery using a nonaqueous electrolyte are subjected to safety tests, such as a nail test and a crush test, heat is generated by an internal shortcircuit current, and the heat generated causes chemical reactions among the active materials, electrolyte and other battery constituent materials, resulting in further heat generation. If the ratio of the number of lithium ions to the number of carbon atoms is 0.1 or higher, the heat generation and the resultant inner pressure increase due to vaporization of the electrolyte act as a trigger, causing the above-mentioned lithium carbide formation. It follows that the inner pressure suddenly rises, which endangers the safety of the battery. For this reason, charges and discharges of a carbonaceous negative electrode are limited, for the time being, so that the ratio of the number of lithium ions to the number of carbon atoms be less than 0.1 from the safety consideration. This has been a bar to development of practical batteries of high energy density.

On the other hand, the conventional polymer batteries, in which a polymer electrolyte is used in place of a nonaqueous electrolyte so as to suppress vaporization of the electrolyte due to heat generated by a shortcircuit, etc., allow the negative electrode active material to be used until the ratio of the number of lithium ions to the number of carbon atoms becomes 0.1 or higher. However, batteries of this type have poor charge and discharge characteristics at a high rate on account of slow diffusion of ions in the polymer electrolyte.

SUMMARY OF THE INVENTION

The present invention has an object to provide a nonaqueous battery having a lithium ion conductive polymer having pores, a positive electrode active material represented by formula: $Li_{1-x}CoO_2$, $Li_{1-x}NiO_2$ or $Li_{1-x}Ni(Co)O_2$ ($0 \leq x \leq 1$), and a carbonaceous negative active material, the battery maintaining high safety even when the molar ratio of the negative electrode active material to the positive active material is reduced, and exhibiting a high energy density and excellent charge-discharge characteristics at a high rate.

A nonaqueous polymer battery according to the present invention includes a lithium ion conductive polymer having pores, a positive active material, and a carbonaceous negative active material. In the nonaqueous polymer battery, the positive active material is represented by $Li_{1-x}CoO_2$ ($0 \leq x \leq 1$) wherein the molar ratio of the carbon atoms in the negative active material to the cobalt atoms in the positive active material is 7.5 or lower; the positive active material is represented by $Li_{1-x}NiO_2$ ($0 \leq x \leq 1$) wherein the molar ratio of the carbon atoms in the negative active material to the nickel atoms in the positive active material is less than 10; or the positive active material is represented by $Li_{1-x}Ni(Co)O_2$ ($Li_{1-x}NiO_2$ having not more than 20% of the nickel atoms thereof displaced with cobalt ions; $0 \leq x \leq 1$) wherein the ratio of the number of the moles of the carbon atoms present in the negative active material to the total number of the moles of the cobalt atoms and the nickel atoms present in the positive active material is less than 10.

According to the present invention, the battery according to the invention has a higher energy density with higher safety than conventional ones which use a nonaqueous electrolyte, not using a polymer electrolyte. Having a polymer electrolyte having pores, the battery of the invention exhibits higher performance in high-rate discharging than conventionally known totally solid batteries.

DETAILED DESCRIPTION OF THE INVENTION

Figure 1:
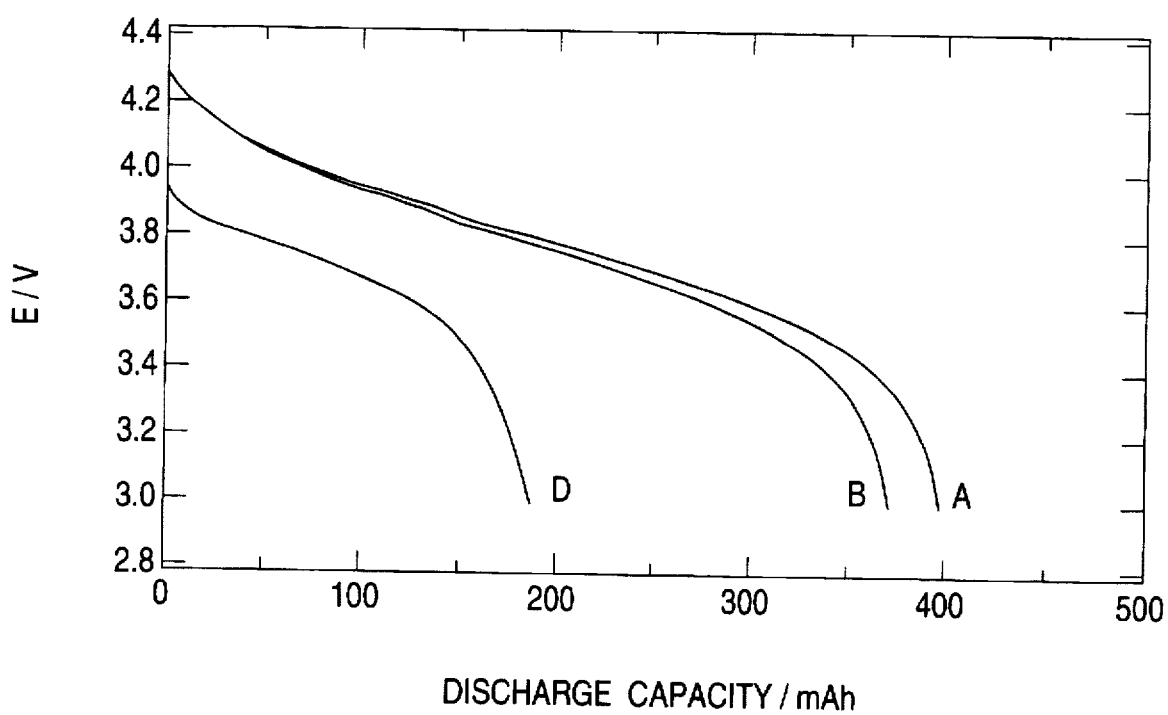
FIG. 1 is a graph showing the discharge characteristics of batteries (A) and (B) according to the invention and conventional battery (D)

The detailed description of the present invention will be described as follows.

The inventors of the present invention have found an utterly novel principle that maximum utilization of a carbonaceous negative active material can be increased by using a polymer electrolyte having pores. Based on this finding, the invention provides a nonaqueous battery having high safety, a markedly increased energy density, and excellent charge and discharge characteristics at a high rate.

In a conventional battery containing a nonaqueous electrolyte, the electrolyte is vapored by heat generated by a shortcircuit, etc., to cause a sudden increase in inner pressure. In such a case, when intercalation at a carbonaceous negative electrode is proceeded, particularly when the ratio of the number of lithium ions to the number of carbon atoms becomes 0.1 or higher, lithium and carbon in the negative electrode react to form lithium carbide with heat generation, thereby leading to an abrupt further increase in inner pressure. For this reason, charges and discharges at a carbonaceous negative electrode are limited, for the time being, so that the ratio of the number of lithium ions to the number of carbon atoms be less than 0.1 from the safety consideration. This has been a bar to development of practical batteries of high energy density.

The battery according to the invention has a feature using a lithium ion conductive polymer electrolyte having pores thereby to reduce the proportion of the negative active material to the positive active material in amount. Use of the lithium ion conductive polymer electrolyte having pores has made it possible to inhibit an increase in inner pressure which would have been observed in a conventional battery using a nonaqueous electrolyte due to evaporation of the electrolyte in case of a shortcircuit, etc. As a result, even when a carbonaceous negative active material is consumed to a ratio of the number of lithium ions to the number of carbon atoms of 0.1 or higher, lithium and carbon in the negative electrode are prevented from reacting to form lithium carbide, whereby heat generation accompanying the reaction and the resultant abrupt increase in inner pressure can be inhibited. Therefore, the battery of the invention thus achieves a great improvement in possible utilization of the carbonaceous negative electrode, i.e., maximum utilization with safety. There is thus provided a battery having high safety as well as high energy density by using the carbonaceous negative electrode until the ratio of the number of lithium ions to the number of carbon atoms becomes 0.1 or higher and by reducing the proportion of the negative active material to the positive active material.

The lithium ion conductive polymer having pores for use in the invention can be either a solid electrolyte obtained by impregnating a polymer with a nonaqueous electrolyte or a solid electrolyte prepared by solidifying a mixture of a nonaqueous electrolyte and a polymer.

As stated above, a lithium type battery using a totally solid polymer electrolyte shows reduced performance in high-rate charging and discharging due to slow diffusion of ions in the electrolyte. In the invention, to the contrary, the lithium ion conductive polymer electrolyte used in the battery has pores, in which an electrolyte is charged, to furnish passageways through which ions can diffuse fast. As a result, satisfactory performance can be attained in charging and discharging at higher rates than possible with a lithium type battery using a totally solid polymer electrolyte. When the polymer is used in combination with an electrolyte, the amount of the electrolyte required for sufficient contact with electrodes can be smaller than that in the conventional battery containing a nonaqueous electrolyte without using a polymer, thereby improving the safety of the battery. Where the pores of an active material layer are filled with the lithium ion conductive polymer having pores, the amount of an electrolyte present in the pores of the active material layer can be reduced greatly. An active material which repeats expansion and contraction with charges and discharges being used in the positive or negative electrode, the flow of the electrolyte in the pores of the polymer is made faster through the expansion and contraction of the active material. With this flow, lithium ions can be transferred farther. As a result, lithium ions migrate in the electrolyte more smoothly, bringing about improved charge and discharge performance at a high rate.

In the nonaqueous battery of the invention, the lithium ion conductive polymer having pores can be used as a separator so that there is no necessity of separately using a separator having no lithium ion conductivity. This does not mean, however, to exclude a combined use of a separator having no lithium ion conductivity with the lithium ion conductive polymer.

The present invention will now be illustrated by way of Examples as preferred modes.

EXAMPLE 1

Nonaqueous polymer batteries were prepared according to the following procedure.

Battery (A) according to the present invention was prepared as follows.

A mixture consisting of 70 wt % of lithium cobaltate, 6 wt % of acetylene black, 9 wt % of polyvinylidene fluoride (PVDF), and 15 wt % of N-methylpyrrolidone (NMP) was applied onto a side of an aluminum foil of 20 mm in width, 480 mm in length, and 20 µm in thickness and dried at 150° C. to evaporate NMP. The other side of the aluminum foil was coated similarly. The coated aluminum foil was pressed to prepare a positive electrode.

A mixture consisting of 81 wt % of graphite, 9 wt % of PVDF, and 10 wt % of NMP was applied to a side of a nickel foil having a thickness of 14 µm and dried at 150° C. to evaporate NMP. The other side of the nickel foil was coated similarly. The coated nickel foil was pressed to prepare a negative electrode.

A mixture of NMP and polyacrylonitrile (PAN) having a molecular weight of about 100,000 at a weight ratio of 10:1 was applied to the entire area of each side of the negative electrode under vacuum to make PAN be absorbed into the pores of the active material layer. The negative electrode was then heated at 80° C. for 30 minutes to dissolve PAN in NMP. Incidentally, the porous degree of the porous polymer can be controlled by changing the amount of NMP. The negative electrode was casted in water to extract NMP to make PAN a casting-extraction process porous polymer, followed by drying at 65° C. for 10 hours under vacuum to remove water.

The resulting negative electrode and the positive electrode, to which no polymer is applied, were put one on another with a 30 µm thick polyethylene separator interposed therebetween and rolled up. The roll was put in an angular stainless steel battery case having a height of 47.0 mm, a width of 22.2 mm, and a thickness of 6.4 mm.

Ethylene carbonate (EC) and dimethyl carbonate (DMC) were mixed at a volume ratio of 1:1, and 1 mol/l of $LiPF_6$ was added thereto to prepare an electrolyte. The electrolyte was poured into the battery case to obtain a battery of the invention designated battery (A) having a nominal capacity of 400 mAh. On pouring the electrolyte, PAN in the negative electrode was swollen to give a porous polymer electrolyte. The stainless steel case used had grooves (what we call an irreversible safety valve) that are designed to develop cracks with an increase in inner pressure to relieve inside gas thereby to prevent the case from bursting. The molar ratio of C atom contained in the negative active material to Co atom contained in the positive active material was made 7.5.

Battery (B) according to the invention was prepared in the same manner as for battery (A), except that a PAN porous polymer electrolyte was put in not only the negative electrode but in the pores of the positive active material layer. Incorporation of PAN into the pores of the positive active material layer was carried out in the same manner as in the incorporation into the pores of the negative active material layer.

Conventional battery (C) having no polymer electrolyte was prepared in the same manner as for battery (A), except that PAN was not put into the pores of the negative active material layer.

Conventional battery (D) was prepared in the same manner as for battery (B), except that each of the positive electrode and the negative electrode after having dissolved PAN in NMP was not casted in water but directly dried at 65° C. for 10 hours under vacuum to remove NMP thereby to solidify PAN in dry process and that the positive and negative electrodes were rolled up without a separator therebetween. It battery (D), a shortcircuit between the positive and negative electrodes could be prevented without a separator by applying PAN thick on both sides of each electrode. Since PAN was solidified in dry process, the polymer electrolyte had no continuous pores unlike the case of casting-extraction, and all the electrolyte poured was infiltrated into PAN to provide a totally solid battery.

Batteries (A) and (B) according to the invention and conventionally known battery (C) were each charged until the positive active material became $Li_{0.25}CoO_2$ and the ratio of the number of lithium ions to the number of carbon atoms of the negative active material reached 0.1. Thereafter, the batteries were subjected to a safety test in which a nail 3 mm in diameter was put in to pierce through. The results of the test are shown in Table 1 below. It is seen from the results in the Table that batteries (A) and (B) according to the invention are superior to conventional battery (C) in safety. It is also seen that battery (B) is still safer than battery (A).

TABLE 1

| Results of Nail Test | |
| --- | --- |
| Battery (A) | The safety valve burst with no smoking. |
| Battery (B) | The safety valve worked with no smoking. |
| Battery (C) | The safety value burst with smoking. |

Batteries (A) and (B) according to the invention and conventional battery (D) were each charged at 25° C. at a charging current of 0.3 CA for 1 hour and then at a constant voltage of 4.35 V for 2 hours, and then discharged to 3.0 V at a current of 1 CA. The results obtained are shown in FIG. 1, in which the discharge voltage (V) is plotted as ordinate and the discharge capacity (mAh) as abscissa. It can be understood from FIG. 1 that batteries (A) and (B) according to the invention exhibit far more excellent discharge characteristics than conventional battery (D).

In using $Li_{1-x}CoO_2$ as a positive active material of a lithium ion secondary battery, when a charge is ended at a charge voltage of 4.35 V for obtaining satisfactory cycle characteristics, the positive active material at the end of charging becomes $Li_{0.25}CoO_2$. In this case, the utilization of the positive active material is 75%. In a conventional battery using a nonaqueous electrolyte, in order to conduct charges and discharges with the ratio of the number of lithium ions to the number of carbon atoms falling within a range of less than 0.1, in which range safety can be secured, the molar ratio of the C atoms present in the negative active material to the Co atoms present in the positive active material should be more than 7.5. The C to Co molar ratio (7.5) is calculated from equation:

$$R_-/R_+ = 0.75/0.1 = 7.5$$

wherein $R_-$ is the upper limit of the ratio of the number of lithium ions to the number of carbon atoms of a carbonaceous negative active material in conventional battery (C) having a safety problem; $R_+$ is the upper limit of x in $Li_{1-x}CoO_2$ which varies with charges and discharges, at and below which satisfactory cycle characteristics can be secured. In the present invention, batteries having high safety and a high energy density can be obtained even with the above C/Co molar ratio being 7.5 or lower.

EXAMPLE 2

Nonaqueous polymer batteries were prepared according to the following procedure.

Batteries (E) and (F) according to the present invention and conventional batteries (G) and (H) were prepared in the same manner as for batteries (A), (B), (C), and (D) of Example 1, respectively, except for using $Li_{1-x}NiO_2$ as a positive active material. The molar ratio of the C atoms present in the negative active material to the Ni atoms present in the positive active material was made 9.5.

Batteries (E) and (F) according to the invention and conventional battery (G) were each charged until the positive active material became $Li_{0.05}NiO_2$ and the ratio of the number of lithium ions to the number of carbon atoms of the negative active material reached 0.1. Thereafter, the batteries were subjected to a safety test in which a nail 3 mm in diameter was put in to pierce through. The results of the test are shown in Table 2 below. It is seen from the results in the Table that batteries (E) and (F) according to the invention are superior to conventional battery (G) in safety. It is also seen that battery (F) is still safer than battery (E).

TABLE 2

| Results of Nail Test | |
| --- | --- |
| Battery (E) | The safety valve burst with no smoking. |
| Battery (F) | The safety valve worked with no smoking. |
| Battery (G) | The safety value burst with smoking. |

Figure 2:
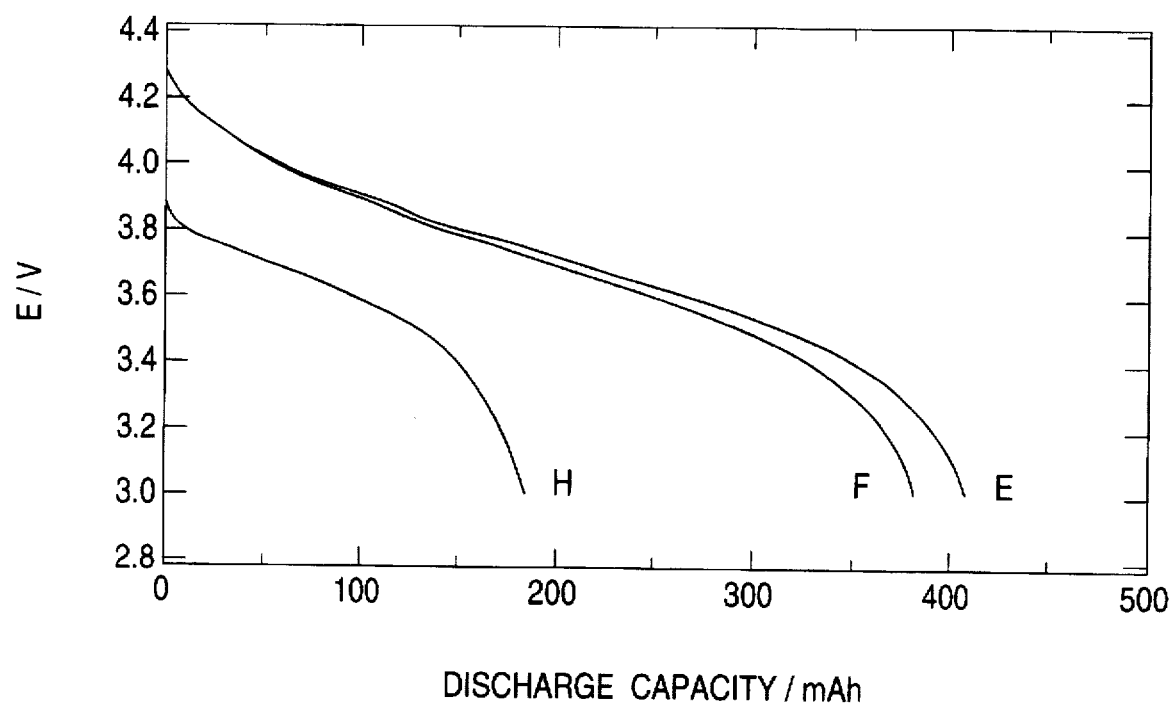
FIG. 2 is a graph showing the discharge characteristics of batteries (E) and (F) according to the invention and conventional battery (H)

Batteries (E) and (F) according to the invention and conventional battery (H) were each charged at 25° C. at a charging current of 0.3 CA for 1 hour and then at a constant voltage of 4.35 V for 2 hours, and then discharged to 3.0 V at a current of 1 CA. The results obtained are shown in FIG. 2, in which the discharge voltage (V) is plotted as ordinate and the discharge capacity (mAh) as abscissa. It can be understood from FIG. 2 that batteries (E) and (F) according to the invention exhibit far more excellent discharge characteristics than conventionally known battery (H).

In using $Li_{1-x}NiO_2$ as a positive active material of a lithium ion secondary battery, the maximum possible utilization of $Li_{1-x}NiO_2$, at which satisfactory cyclic characteristics can be maintained, is 100%. In a conventional battery using a nonaqueous electrolyte, in order to conduct charges and discharges with the ratio of the number of lithium ions to the number of carbon atoms being less than 0.1, in which range safety can be secured, the molar ratio of the C atoms present in the negative active material to the Ni atoms present in the positive active material should be 10 or higher. The C to Ni molar ratio (10) is calculated from equation:

$$R_-/R_+ = 1/0.1 = 10$$

wherein $R_-$ is the upper limit of the ratio of the number of lithium ions to the number of carbon atoms of a carbonaceous negative active material in conventional battery (G) having a safety problem; $R_+$ is the upper limit of x in $Li_{1-x}NiO_2$, at and below which satisfactory cycle characteristics can be secured. In the present invention, batteries having high safety and a high energy density can be obtained even with the above molar ratio being less than 10.

While, in Example 2, $Li_{1-x}NiO_2$ is used up to 95% utilization, and the molar ratio of C atoms in the negative active material to Ni atoms in the positive active material is set at 9.5, the maximum possible utilization of $Li_{1-x}NiO_2$ is 100%, at which satisfactory cycle characteristics can be retained. In principle, the same results as in Example 2 are to be obtained provided that the molar ratio of C atoms in the negative active material to Ni atoms in the positive active material is 9.5 or more and less than 10 and that the variation in the ratio of the number of lithium ions to the number of carbon atoms of the carbonaceous negative active material due to charges and discharges is 0.1.

EXAMPLE 3

Nonaqueous polymer batteries were prepared in accordance with the following procedure.

Batteries (I) and (J) according to the invention and conventional batteries (K) and (L) were prepared in the same manner as for batteries (A), (B), (C), and (D) of Example 1, respectively, except for using $Li_{1-x}Ni_{0.9}Co_{0.1}O_2$ ($0 \leq x \leq 1$) as a positive active material. The ratio of the number of moles of the C atoms present in the negative active material to the total number of moles of the Co and Ni atoms present in the positive active material was made 9.5.

Batteries (I) and (J) according to the invention and conventional battery (K) were each charged until the positive active material became $Li_{0.05}Ni_{0.9}Co_{0.1}O_2$ and the ratio of the number of lithium ions to the number of carbon atoms of the negative active material reached 0.1. Thereafter, the batteries were subjected to a safety test in which a nail 3 mm in diameter was put in to pierce through. The results of the test are shown in Table 3 below. It is seen from the results in the Table that batteries (I) and (J) according to the invention are superior to conventional battery (K) in safety. It is also seen that battery (J) is still safer than battery (I).

TABLE 3

| Results of Nail Test | |
|---|---|
| Battery (I) | The safety valve burst with no smoking. |
| Battery (J) | The safety valve worked with no smoking. |
| Battery (K) | The safety value burst with smoking. |

Figure 3:
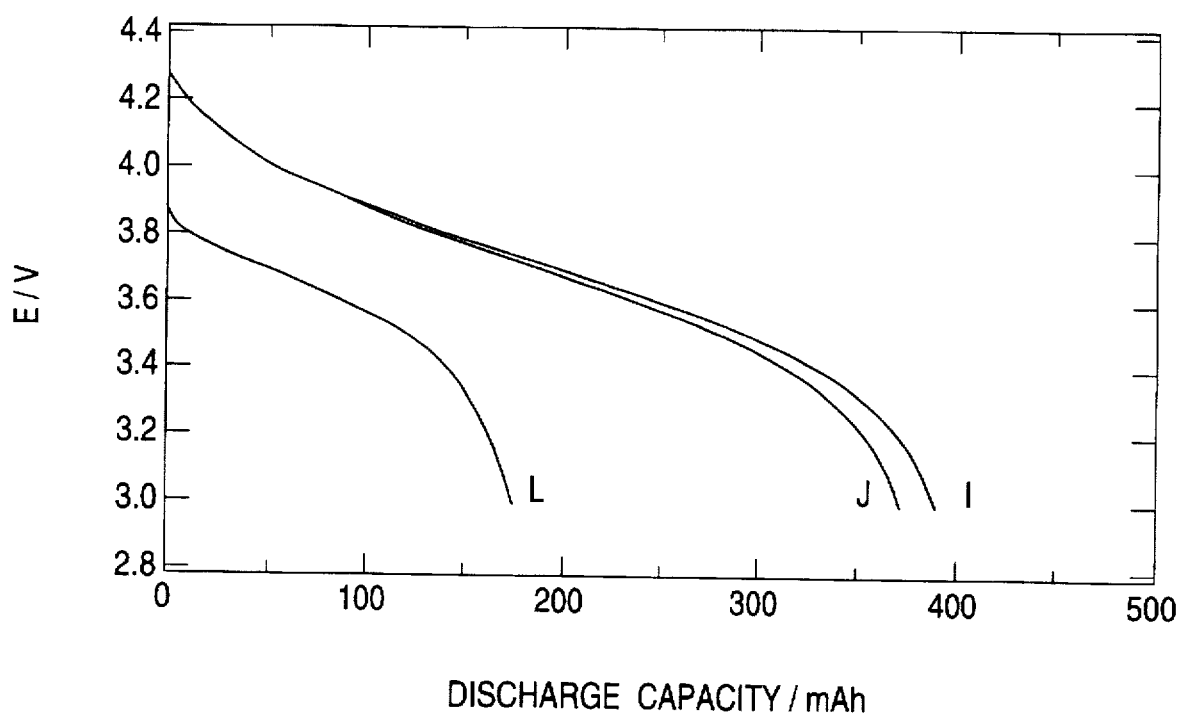
FIG. 3 is a graph showing the discharge characteristics of batteries (I) and (J) according to the invention and conventional battery (L).

Batteries (I) and (J) according to the invention and conventional battery (L) were each charged at 25° C. at a charging current of 0.3 CA for 1 hour and then at a constant voltage of 4.35 V for 2 hours, and then discharged to 3.0 V at a current of 1 CA. The results obtained are shown in FIG. 3, in which the discharge voltage (V) is plotted as ordinate and the discharge capacity (mAh) as abscissa. It can be understood from FIG. 3 that batteries (I) and (J) according to the invention exhibit far more excellent discharge characteristics than conventionally known battery (L).

In using $Li_{1-x}Ni(Co)O_2$ as a positive active material of a lithium ion secondary battery, the maximum possible utilization of $Li_{1-x}Ni(Co)O_2$, at which satisfactory cyclic characteristics can be maintained, is 100%. In a conventional battery using a nonaqueous electrolyte, in order to conduct charges and discharges with the ratio of the number of lithium ions to the number of carbon atoms of the carbonaceous negative active material being less than 0.1, in which range safety can be secured, the molar ratio of the C atoms present in the negative active material to the total number of moles of the Ni atoms and the Co atoms present in the positive active material should be 10 or higher. The C to (Ni+Co) molar ratio (10) is calculated from equation:

$$R_+/R_- = 1/0.1 = 10$$

wherein $R_-$ is the upper limit of the ratio of the number of lithium ions to the number of carbon atoms of a carbonaceous negative active material in conventional battery (K) having a safety problem; $R_+$ is the upper limit of x in $Li_{1-x}Ni(Co)O_2$, at and below which satisfactory cycle characteristics can be secured. In the present invention, batteries having high safety and a high energy density can be obtained even with the above molar ratio being less than 10.

While, in Example 3, $Li_{1-x}Ni(Co)O_2$ is used up to 95% utilization, and the molar ratio of C atoms in the negative active material to the total number of moles of Ni atoms and Co atoms in the positive active material is set at 9.5, the maximum possible utilization of $Li_{1-x}Ni(Co)O_2$ is 100%, at which satisfactory cycle characteristics can be retained. In principle, the same results as in Example 3 are to be obtained provided that the molar ratio of C atoms in the negative active material to the total number of moles of the Ni atoms and the Co atoms in the positive active material is 9.5 or more and less than 10 and that the variation in the ratio of the number of lithium ions to the number of carbon atoms of the carbonaceous negative active material due to charges and discharges is 0.1.

While in batteries (A), (B), (E), (F), (I), and (J) polyacrylonitrile is used as a high polymer of the polymer electrolyte, the following high polymers may also be used in the same manner either individually or as a mixture thereof. Other usable polymers include polyethers, such as polyethylene oxide and polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, and derivatives of these polymers. Copolymers derived from monomers constituting these polymers can also be used.

While in batteries (A), (B), (E), (F), (I), and (J) a mixed solution of EC and DMC is used as a nonaqueous electrolyte which is to be infiltrated into the polymer in order to improve lithium ion conductivity and also as an electrolyte which is used for filling the pores of the lithium ion conductive polymer, other solvents may be used as well. Examples of useful solvents include polar solvents, such as ethylene carbonate, propylene carbonate, dimethyl carbonate, diethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate, and mixtures thereof. The electrolyte to be incorporated into the polymer and the electrolyte to be used for filling the pores may be the same or different.

While in batteries (A), (B), (E), (F), (I), and (J) $LiPF_6$ is used as a lithium salt which is to be incorporated into the lithium ion conductive polymer and the nonaqueous electrolyte, other lithium salts, such as $LiBF_4$, $LiAsF_6$, $LiClO_4$, $LiSCN$, $LiI$, $LiCF_3SO_3$, $LiCl$, $LiBr$, $LiCF_3CO_2$, etc. and mixtures thereof, can be used as well. The lithium salt used in the ion conductive polymer and that used in the nonaqueous electrolyte may be either the same or different.

What is claimed is:

1. A nonaqueous polymer battery comprising:

a lithium ion conductive polymer having pores, which is provided between a negative electrode and a positive electrode;

a positive active material represented by $Li_{1-x}CoO_2$, wherein $0 \leq x \leq 1$; and a carbonaceous negative active material;

wherein the molar ratio of the carbon atoms in said negative active material to the cobalt atoms in said positive active material is 7.5 or lower.

2. A nonaqueous polymer battery according to claim 1, wherein said lithium ion conductive polymer contains an electrolyte in the pores thereof.

3. A nonaqueous polymer battery comprising:

a lithium ion conductive polymer having pores;

a positive active material represented by $Li_{1-x}CoO_2$, wherein $0 \leq x \leq 1$; and a carbonaceous negative active material;

wherein the molar ratio of the carbon atoms in said negative active material to the cobalt atoms in said positive active material is 7.5 or lower: and said lithium ion conductive polymer is provided in a negative active material layer.

4. A nonaqueous polymer battery comprising:

a lithium ion conductive polymer having pores;

a positive active material represented by $Li_{1-x}CoO_2$, wherein $0 \leq x \leq 1$; and a carbonaceous negative active material;

wherein the molar ratio of the carbon atoms in said negative active material to the cobalt atoms in said positive active material is 7.5 or lower; and said lithium ion conductive polymer is provided in a negative active material layer and a positive active material layer.

5. A nonaqueous polymer battery according to claim 3, wherein said lithium ion conductive polymer contains an electrolyte in said pores.

6. A nonaqueous polymer battery according to claim 4, wherein said lithium ion conductive polymer contains an electrolyte in said pores.

7. A nonaqueous polymer battery comprising:

a lithium ion conductive polymer having pores, which is provided between a negative electrode and a positive electrode;

a positive active material represented by $Li_{1-x}NiO_2$, wherein $0 \leq x \leq 1$; and a carbonaceous negative active material;

wherein the molar ratio of the carbon atoms in said negative active material to the nickel atoms in said positive active material is less than 10.

8. A nonaqueous polymer battery according to claim 7, wherein said lithium ion conductive polymer contains an electrolyte in the pores thereof.

9. A nonaqueous polymer battery comprising:

a lithium ion conductive polymer having pores;

a positive active material represented by $Li_{1-x}NiO_2$, wherein ($0 \leq x \leq 1$); and a carbonaceous negative active material;

wherein the molar ratio of the carbon atoms in said negative active material to the nickel atoms in said positive active material is less than 10; and said lithium ion conductive polymer is provided in a negative active material layer.

10. A nonaqueous polymer battery comprising:

a lithium ion conductive polymer having pores;

a positive active material represented by $Li_{1-x}NiO_2$, wherein $0 \leq x \leq 1$; and a carbonaceous negative active material;

wherein the molar ratio of the carbon atoms in said negative active material to the nickel atoms in said positive active material is less than 10; and said lithium ion conductive polymer is provided in a negative active material layer and a positive active material layer.

11. A nonaqueous polymer battery according to claim 9, wherein said lithium ion conductive polymer contains an electrolyte in said pores.

12. A nonaqueous polymer battery according to claim 10, wherein said lithium ion conductive polymer contains an electrolyte in said pores.

13. A nonaqueous polymer battery comprising:

a lithium ion conductive polymer having pores, which is provided between a negative electrode and a positive electrode;

a positive active material represented by $Li_{1-x}Ni(Co)O_2$, which is $Li_{1-x}NiO_2$ having more than 0% to not more than 20% of the nickel atoms thereof displaced with cobalt atoms; wherein $0 \leq x \leq 1$; and a carbonaceous negative active material;

wherein the ratio of the number of the moles of the carbon atoms present in said negative active material to the total number of the moles of the cobalt atoms and the nickel atoms present in said positive active material is less than 10.

14. A nonaqueous polymer battery according to claim 13, wherein said lithium ion conductive polymer contains an electrolyte in the pores thereof.

15. A nonaqueous polymer battery comprising:

a lithium ion conductive polymer having pores;

a positive active material represented by $Li_{1-x}Ni(Co)O_2$ which is $Li_{1-x}NiO_2$ having more than 0% to not more than 20% of the nickel atoms thereof displaced with cobalt atoms: wherein $0 \leq x \leq 1$; and a carbonaceous negative active material;

wherein the ratio of the number of the moles of the carbon atoms present in said negative active material to the total number of the moles of the cobalt atoms and the nickel atoms present in said positive active material is less than 10; and said lithium ion conductive polymer is provided in a negative active material layer.

16. A nonaqueous polymer battery comprising:

a lithium ion conductive polymer having pores;

a positive active material represented by $Li_{1-x}Ni(Co)O_2$ which is $Li_{1-x}NiO_2$ having more than 0% to not more than 20% of the nickel atoms thereof displaced with cobalt atoms; wherein $0 \leq x \leq 1$; and a carbonaceous negative active material;

wherein the ratio of the number of the moles of the carbon atoms present in said negative active material to the total number of the moles of the cobalt atoms and the nickel atoms present in said positive active material is less than 10; and said lithium ion conductive polymer is provided in a negative active material layer and a positive active material layer.

17. A nonaqueous polymer battery according to claim 15, wherein said lithium ion conductive polymer contains an electrolyte in said pores.

18. A nonaqueous polymer battery according to claim 16, wherein said lithium ion conductive polymer contains an electrolyte in said pores.

* * * * *